US011085437B2

(12) United States Patent
Nielsen et al.

(10) Patent No.: US 11,085,437 B2
(45) Date of Patent: Aug. 10, 2021

(54) CONTROL METHOD (71) Applicant: GRUNDFOS HOLDING A/S, Bjerringbro (DK)

(72) Inventors: Brian Kongsgaard Nielsen, Viborg (DK); Carsten Skovmose Kallesøe, Viborg (DK)

(73) Assignee: Grundfos Holding A/S, Bjerringbro (DK)

( * ) Notice: Subject to any disclaimer, the term of this patent is extended or adjusted under 35 U.S.C. 154(b) by 349 days.

(21) Appl. No.: 14/826,631

(22) Filed: Aug. 14, 2015

(65) Prior Publication Data

US 2016/0047372 A1 Feb. 18, 2016

(30) Foreign Application Priority Data

Aug. 15, 2014 (EP) ..................................... 14181144

(51) Int. Cl.
*F04B 49/06* (2006.01)
*F04D 15/00* (2006.01)
*F04B 49/20* (2006.01)

(52) U.S. Cl.
CPC ............ *F04B 49/065* (2013.01); *F04B 49/20* (2013.01); *F04D 15/0066* (2013.01)

(58) Field of Classification Search
CPC ........ F04B 49/065; F04B 49/20; F04B 17/03; F04B 49/002; F04B 49/08; F04B 49/106; F04B 51/00; F24D 19/1012; F04D 15/0066; F04D 13/06; F04D 15/0088; F04D 25/06; F04D 27/001; F04D 27/004

USPC ......... 417/20, 22, 32, 42, 43, 44.2, 292, 300
See application file for complete search history.

(56) References Cited

U.S. PATENT DOCUMENTS

2005/0193752 A1* 9/2005 Eisenhower ........ F24D 19/1012
62/180
2011/0076156 A1* 3/2011 Stiles, Jr. ................ F04B 49/20
417/42

FOREIGN PATENT DOCUMENTS

| CA | 2 274 782 A1 | 11/1999 | |
| CA | 2274782 | * 11/1999 | .............. F04B 49/06 |
| DE | 33 15 828 A1 | 10/1984 | |
| DE | 10 2006 049440 A1 | 4/2007 | |
| EP | 1 323 984 A1 | 7/2003 | |
| EP | 1323984 A1 * | 7/2003 | ......... F04D 15/0066 |
| SU | 1763723 A1 | 9/1992 | |
| WO | 2006137777 A1 | 12/2006 | |

OTHER PUBLICATIONS

The Biology Project, Linear Functions: Exploring the Concept of Slope, The University of Arizona (Year: 2006).*

* cited by examiner

*Primary Examiner* — Alexander B Comley
(74) *Attorney, Agent, or Firm* — McGlew and Tuttle, P.C.

(57) ABSTRACT

A control method for a pump assembly (10, 12) in a pneumatic or hydraulic system controls a speed (n) of the pump assembly (10, 12) in dependence on at least one variable (Dp, p, T, $x_p$) which is detected in the system. An error signal (e) is produced from the detected variable (Dp, p, T, $x_p$) on the basis of a sectionwise monotonic function. On the basis of the error signal, the speed (n) of the pump assembly (10, 12) is controlled.

17 Claims, 7 Drawing Sheets

CONTROL METHOD

CROSS REFERENCE TO RELATED APPLICATIONS

This application claims the benefit of priority under 35 U.S.C. § 119 of European Patent Application 14 181 144.8 filed Aug. 15, 2014, the entire contents of which are incorporated herein by reference.

FIELD OF THE INVENTION

The invention relates to a closed-loop control method for a pump assembly in a pneumatic or hydraulic system, as well as to a pump system which is designed for carrying out such a control method.

BACKGROUND OF THE INVENTION

In branched hydraulic systems, such as for example heating installations with several consumers or water supply systems with various tapping locations, there exists the difficulty of controlling pump assemblies for delivering the medium and which are pre sent in the hydraulic system, such that they provide an adequate pressure at all points of the hydraulic system, but that simultaneously the pressure is not so high, in order on the one hand to avoid undesired flow noises in the system and on the of her hand to keep the energy consumption of the pump assembly to a minimum.

For this, systems are known from the state of the art, which at one or more locations in the hydraulic system for example detect a supply temperature or a flow, and design the control of the pump assembly to the region with the greatest load. Such a system is known for example from DE 33 15 828.

SUMMARY OF THE INVENTION

It is an object of the invention, to improve a control method for a pump assembly in a pneumatic or hydraulic system, in a manner such that with a minimal energy consumption of the pump assembly, the hydraulic system is supplied with pressure in a manner such that valve elements arranged in the hydraulic system can be arranged in an optimal control region.

According to the invention, a control of method is provided for a pump assembly in a pneumatic or hydraulic system. The method comprises the steps of detecting at least one system variable in the system and closed loop controlling a speed of the pump assembly in dependence on the at least one system variable which is detected in the system. An error signal is produced from the detected variable on the basis of a sectionwise monotonic function, on the basis of which error signal the speed of the pump assembly is controlled.

According to another aspect of the invention, a pump system is provided with at least one sensor for detecting a variable in a hydraulic or pneumatic system and with a signal processing device which is designed (configured) for producing at least one error signal on the basis of the detected variable. The pump system further comprises at least one pump assembly with a control device which is designed (configured) for receiving the at least one error signal from the signal processing device and for the control of the speed of the pump assembly on the basis of the at least one error signal, wherein the control device and the signal processing device are designed (configured) for carrying out a control method according to the invention.

The control method according to the invention serves for at least one pump assembly in a pneumatic or hydraulic system. Such a hydraulic system can for example be a water supply mains or a heating installation, in particular with a multitude of consumers. Valves for setting or for the control of the flow for the respective consumer can be provided in such a hydraulic system, on the different consumers.

The invention is hereinafter described further by way of a hydraulic system, but it is to be understood that the invention can accordingly be applied also in a pneumatic system, for example in a ventilation system such as in a heating system or air-conditioning system, which operates with temperature-controlled air. It is also to be understood that when the invention is described hereinafter by way of example of a heating installation, the invention can be realised in a corresponding manner also in of her hydraulic systems, such as air-conditioning systems or water mains systems.

With regard to the control method according to the invention, one envisages the speed of the at least one pump assembly being controllable in dependence on at least one variable which is detected in the system. Thereby, a single pump assembly can be envisaged, but also several pump assemblies connected in parallel and/or series can be envisaged, which can be controlled in a corresponding manner.

According to the invention, one envisages the detected variable not directly forming the basis of the control, but an error signal being produced from the at least one detected variable on the basis of a piecewise or sectionwise monotonic function, on the basis of which error signal the speed of the pump assembly is controlled. A sectionwise monotonic function hereby is to be understood as a function which is composed of at least two functions or sections with different function characteristics. Thereby the function is monotonic in each case in all the sections. This sectionwise monotonic function for example means that different functions for different magnitude regions of the detected variables form the basis for computing the error signal. The use of the error signal has the advantage that this can be more easily incorporated into the control of the pump assembly, since the error signal via the function can be set such that an error signal which is independent of the precise design of the hydraulic system and its components forms the basis of the control of the pump assembly. This permits a simple adaptation and in particular also a simpler control of the pump assembly on the basis of sever al error signals, since these can be linked to one another in a simple manner, for example added or selected in a suitable manner.

The variable in the system can be detected by way of suitable sensors or taken or outputted directly from actuators such as valves and outputted (issued) as a variable which is characteristic of their functional condition.

Thus the at least one variable for example is a pressure value or a valve opening degree, which is detected in the system. The valve opening degree can be taken or tapped directly at the valve or can be a control signal for the valve, which is proportional to the valve opening degree. For example, a separate pressure sensor can be arranged in the hydraulic or pneumatic system, for detecting the pressure value.

According to a further preferred embodiment, the at least one variable can be a temperature value or a flow value which is detected in the system. Likewise, suitable sensors can be provided in the system for this. A flow value can however for example also be directly derived from a further pump assembly arranged in the system, by way of it being determined there on the basis of other variables detected in the pump assembly, for example the speed of the pump assembly. In the case that several variables are detected in the system, this can be several temperature values, several valve opening degrees or several flow values. Different values can also be detected in combination, wherein for each variable, an error signal is outputted in each case on the basis of the mentioned sectionwise monotonic function. The computation or outputting of the error signal has the advantage that different variables, for example valve opening degrees and detected temperature values can thus be incorporated into the control of the pump assembly in a simple manner.

The control method preferably serves for the (closed-loop) control of a hydraulic variable to a hydraulic setpoint. This for example can be the pressure, the temperature, the flow and/or for example a valve opening degree or likewise. This hydraulic variable is controlled to the desired setpoint by way of closed-loop control of the speed or changing the speed. Thereby, the described error signal preferably forms a constituent of the control loop, i.e. the closed-loop control is effected via the error signal or the error signals. The error signals, as described above, are formed via the section-wise monotonous function in dependence on the variable detected in the system. The variable detected in the system thereby corresponds to the hydraulic variable to be (closed-loop) controlled or represents a value which is representative of the hydraulic variable to be (closed-loop) controlled. The speed of the pump assembly is controlled or changed in dependence on the err or signal or error signals, in order to bring the hydraulic variable to be closed-loop controlled to a de sired setpoint. As described below, it is possible via the error signals to also simultaneously control several hydraulic variables or to optimise them in closed control loops.

Preferably, for the computation of the error signal, the detected variable is compared to at least one limit value, and the function of the group of functions, on whose basis the error signal is produced, is exchanged, which is to say swapped or switched, in a predefined manner on reaching the limit value. This means the limit value forms the limit between two sections or functions of the sectionwise monotonic function. This means that different functions are envisaged for determining the error signal, for different predefined magnitude regions of the variable. Thus for example two functions or sections of the sectionwise monotonic function and which are linked to one another can be provided, wherein a first function is used e.g. below the limit value and a second function e.g. on reaching and exceeding the limit value. Accordingly, one can also use more than two functions or sections, which are exchanged at corresponding limit values.

Preferably, the detected variable can be compared with an upper and with a lower limit value, and in each case the section of the sectionwise monotonic function or the function of the group of functions, on the basis of which the error signal is produced, can be exchanged in a predefined manner on reaching the upper limit value as well as on reaching the lower limit value. Thus with this embodiment for example, three different functions or sections are used, wherein a first function is applied below the lower limit value, a second function between the lower and the upper limit value and a third function above the upper limit value.

According to a further preferred embodiment, the functions which are applied above the upper limit value and/or below the lower limit value output an e nor signal which is dependent, and in particular linearly dependent, on the magnitude of the detected variables. Thereby, the same function can be applied below the lower limit value and above the upper limit value.

According to a further preferred embodiment, a function which outputs an error signal which is dependent, in particularly linearly dependent on the magnitude of the variables, can be applied below the upper limit value and/or above the lower limit value, wherein the function between the variable and the error signal, above and below the respective limit value can be different, in particular have different gradients. Thus for example between the lower and the upper limit value, a function can be applied which has a smaller gradient than above the upper and below the lower limit value.

According a further preferred embodiment, the function can have a zero point with a sign change in a region above the lower limit value and below the upper limit value. The zero point preferably lies in the middle between the upper and the lower limit value. The error signal would thus be zero at the zero point. This permits the control of the pump assembly to be designed such that it preferably controls the pump assembly in its speed such that the variable is controlled to the region of the zero point, or several variables are controlled such that the error signals in the complete system add to zero, which is to say the system parameters are set such that the sum of the error signals preferably assumes the value zero or approaches the value zero.

According to a further possible embodiment of the invention, the error signal which is outputted on reaching the upper limit value and above the upper limit value can have a different sign (polarity) than the error signal which is outputted on re aching or below the lower limit value. This permits a control which contributes to keeping the variable in the region between the upper and the lower limit value.

According to a further possible embodiment, a function or section of the sectionwise monotonic function or several of the functions or sections which are applied can also be designed such that they output a constant value, in particular the value zero forth e error signal. Thus for example the function can be selected such that it outputs such a constant value above and below a limit value.

Further preferably, the production of the error signal can be effected in a signal processing device which is assigned to a sensor for detecting the variables, and the produced error signal is transferred to a control device of the pump assembly which effects a control of the speed of the pump assembly. This design is particularly advantageous since thus the control device of the pump assembly can be designed completely independently of the type of applied sensors or actuating elements, at which the variables are detected. The signal processing device can be specially adapted to the respective sensor or the actuating element, for example a valve, so that it contains the matching or desired functions which take into account the characteristic properties of the sensor or of the region of the hydraulic system, at which the variable is detected. The error signal can be adapted to the applied control and regulation device of the pump assembly such that a standardised error signal is outputted. Preferably, the functions can be adapted or set in the signal processing device.

Particularly preferably, the signal processing device can be integrated directly into the sensor or the actuating element such as a valve. The signal processing device however can also be designed as a separate component, to which the output signal of a sensor or of an actuating elements such as a valve is fed as an input variable. It is also possible to provide a signal processing device which operates several sensors or actuating elements such as valves and accordingly outputs several error signals for the connected sensors or actuating elements.

As has already been described above, the system can prefer ably be designed such that several variables are detected, on the basis of which an error signal is produced in each case on the basis of a group of at least two functions which are linked to one another or of a sectionwise monotonic function. Thereby, preferably an err or signal is produced in each case from a corresponding sectionwise monotonic function, for each of the variables. Since the error signals, as previously described, are preferably standardised and the adaptation to the respective sensors or regions of the system, in which the sensors are arranged, is effected via the respective functions, this permits different sensors or actuating elements such as valves which detect or output the variables, to be combined with one another in a system without any problem and to permit them to flow which is to say to be incorporated into the control of the pump assembly.

In one possible embodiment of the invention, several, preferably all error signals in the system can be added and the control of the speed of the pump assembly can be effected on the basis of the added error signals. Preferably, the control of the speed of the pump is thereby such that the added error signal approaches the value zero. In this manner, the various error signals are linked to one another and the speed of the pump assembly is regulated or closed-loop controlled such that the desired hydraulic setpoints, be it pressure, temperature, flow and/or for example a valve opening degree etc. are achieved in all regions of the system, in which variables are detected and on the basis of which error signals are determined.

According to a particular embodiment of the invention, the individual error signals are multiplied by individual weighting factors before the addition. This multiplication can likewise be effected in the previously described signal processing device or however also in a control device of the pump assembly. The error signals of individual components in the system are differently weighted due to the weighting factors, so that for example certain valves or sections of the system can be given a greater weight on control of the pump assembly, in order for example to always prioritise a desired flow in this region.

According to an alternative embodiment of the invention, it is possible to select one or more error signals from a plurality of error signals, on the ba sis of which one or more error signals the control of the speed of the pump assembly is effected. In this case too, a weighting or a prioritisation of the error signal can be effected as the case may be. Thus a priority for the selection can be assigned to individual error signals. If several error signals are selected, these in turn, as previously described, can be added and also prior to this be multiplied by weighting factors as the case may be.

The speed of the pump assembly is preferably controlled in dependence on a differential pressure or a flow, and the differential pressure or the flow is regulated on the basis of one or more error signals. This means that on the basis of the error signals, firstly the desired differential pressure or flow is selected and the regulation of the pump assembly is subsequently effected, such that this differential pressure or flow is achieved by the pump assembly. The speed of the pump assembly can be varied by a control device of the pump assembly for this.

The speed of the pump assembly can be changed directly or indirectly in defined steps, in a manner depending on the error signal. If the error signal is e.g. used for determining the differential pressure or the flow which the pump assembly is to achieve, as previously described, this would be an indirect setting of the speed. By way of the error signal, a continuous adaptation of the speed can be effected in a direct or indirect manner or also an adaptation in predefined steps, in which the speed is increased or reduced, in order to achieve a desired flow and/or differential pressure or also the minimisation of the error signal in a direct manner.

Particularly preferably, it is possible for the speed of the at least one pump assembly additionally to the error signal to be controlled on the basis of an algorithm for minimising the power uptake or energy consumption. These two algorithms or controls can be linked with one another or be superimposed on one another, so that the pump control continuously strives to minimise the energy consumption, so long as the error signals are kept to a minimal value or ideally to a value zero. If error signals are led to the control, this, as the case may be, leads to a change in the speed of the pump assembly, which is counter to the minimisation of the energy consumption. This is then effected until the hydraulic parameters of the system are held in the desired limits by way of detection at the respective sensors. If a minimisation of the energy consumption takes place simultaneously, then with this one succeeds in the hydraulic setpoint being able to be achieved at minimal energy consumption.

The algorithm for minimising the energy consumption is preferably designed accordingly, in a manner such that it strives to reduce the speed of the pump assembly. If then the reduction of the speed leads to individual sensors or actuating elements outputting error signals, then these error signals e.g. again effect an increase of the speed, so that the hydraulic setpoints can be achieved.

A pump system is also the subject matter of the invention, apart from the previously described control system. The pump system according to the invention comprises at least one sensor for detecting a variable in a hydraulic or pneumatic system. The sensor thereby can be a sensor as has been previously described, which for example detects the temperature, the flow and/or the pressure. Thereby, the sensor can be designed as a separate sensor or be part of an actuating device, such as of a valve or of a pump assembly. The sensor can detect the valve opening degree and output this, in the case of a valve. A sensor in this context is also to be understood as an actuating device such as a valve which detects or outputs the opening degree in another manner. The flow can likewise be detected or deter mined in a pump assembly, for example from the electrical and/or hydraulic variables, and be outputted in the context of a sensor.

Additionally to the sensor, at least one signal processing device is provided, which is designed for producing at least one error signal on the basis of the detected variables. Moreover, the pump system comprises at least one pump assembly with a control device which is designed for receiving the at least one error signal from the signal processing device and for the control of the pump assembly on the basis of the at least one error signal. Thereby, the control device and the signal processing device are designed for carrying out a control method, as has bee n previously described. The signal processing device and the control device are preferably spatially distanced to one another, but as the case may be can also be integrated into an electronic subassembly. The signal processing device is preferably arranged in the proximity of the sensor, in particular is integrated into this, whereas the control device is preferably arranged in the proximity of the pump assembly, preferably in an electronics housing directly on the drive motor of the pump assembly.

BRIEF DESCRIPTION OF THE DRAWINGS

The invention is hereinafter described by way of the attached figures. In these are shown in.

DETAILED DESCRIPTION

Different variants of hydraulic systems, in which a control method according to the invention, as is subsequently described can be applied, are described by way of FIGS. 1 to 7. It is to be understood that this principle can also be transferred from hydraulic systems in the same manner to pneumatic systems, for example ventilation systems which are likewise the subject matter of the invention.

Figure 1:
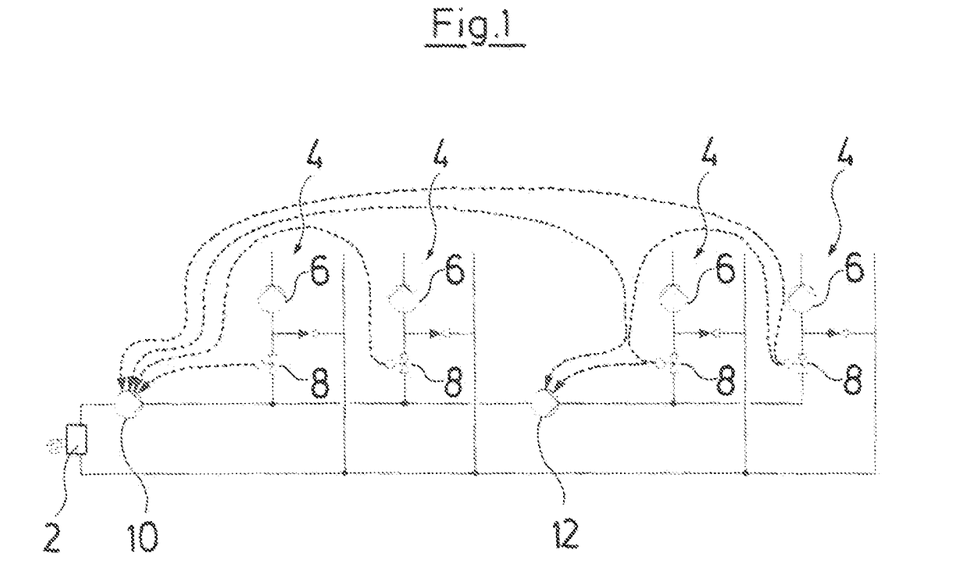
FIG. 1 is a view showing a first example for a hydraulic system of the invention.

FIG. 1 shows a heating and/or cooling system with a heat source or a cold source 2 which in the case of a heat source can be designed for example as a heating boiler. The shown system comprise several, in this example four load circuits 4 which as mixing circuits are provided in each case with a mixing pump 6 and a control valve 8. The feed of heat transfer medium from the heat or cold source 2 into the respective load circuit 4 is controlled via the opening degree of the control valve 8. This can be effected for example in a manner dependent on room temperature, in order for example to achieve a predefined room temperature. Here, two pump assemblies 10, 12 in the form of circulation pump assemblies are arranged in the feed conduit, and these assemblies deliver heat transfer medium, for example water, from the heat source or cold source 2 to the load circuits 4. Thereby, the pump assembly 10 lies upstream of all four load circuits, whereas the second pump assembly 12 is situated downstream of the first two load circuits and upstream of the subsequent two load circuits 4. The control valves 8 are designed such that they detect the valve opening degree, and in a signal processing device which is explained further below, produce an error signal which is transferred to the pump assemblies 10 and 12 for their speed control. This is shown in FIG. 1 by the da shed lines, wherein one can recognise that the error signals of all four control valves 8 are transferred to the first pump assembly 10, whereas the error signals of the two downstream load circuits 4 are only transferred to the second pump assembly 12 which is only envisaged for the supply of these two load circuits 4.

Figure 2:
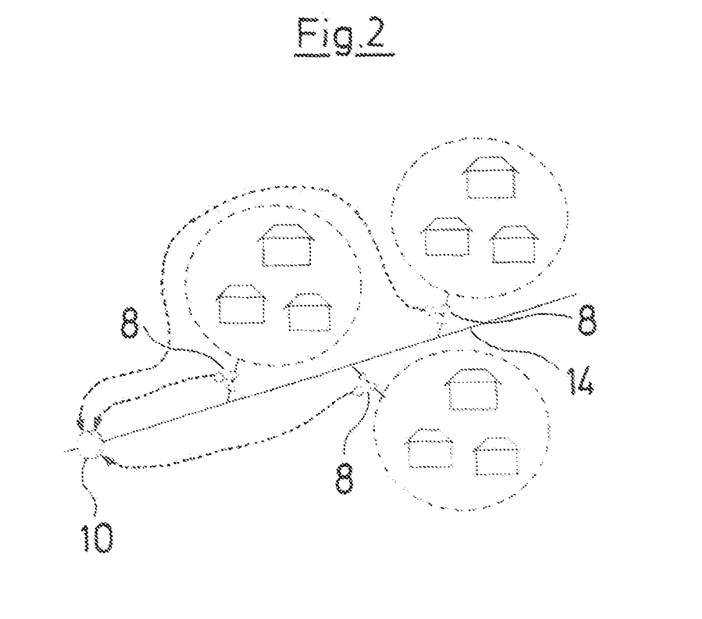
FIG. 2 is a view showing a second example for a hydraulic system according to the invention.

The hydraulic system shown in FIG. 2 represents a water supply mains with a pump assembly 10 and three control valves 8. In this case, the control valves 8 can operate as pressure controllers, in order to (closed-loop) control the pressure in the connecting branches of the hydraulic system. The pump assembly 10 delivers into a central supply conduit 14 from which branches with the control valves 8 branch, for example in each case for the supply of several buildings, e.g. in a town district. The pressure in these parts or branches is controlled via the control valves 8. These control valves 8 also output their valve opening degree, on the basis of which an e nor signal is produced in a signal processing device, said error signal being transferred to the pump assembly 10 in order to control this in its speed on the basis of these error signals, as is described hereinafter.

A pump assembly 10 in the context of this description can also be understood as an arrangement of several pumps. The pump assembly for example can be a booster pump or a booster pump arrangement as can be applied in particular in a water supply mains.

Figure 3:
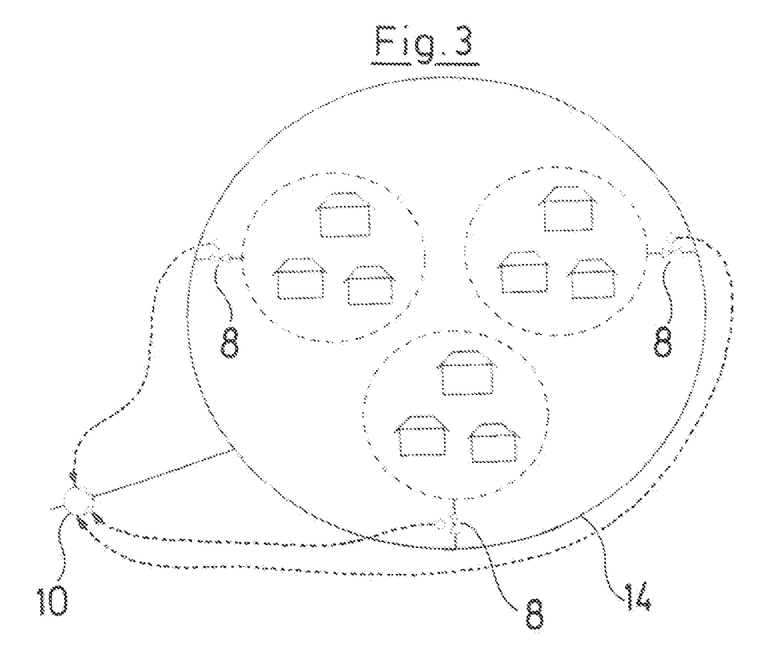
FIG. 3 is a view showing a third example for a hydraulic system according to the invention.
Figure 4:
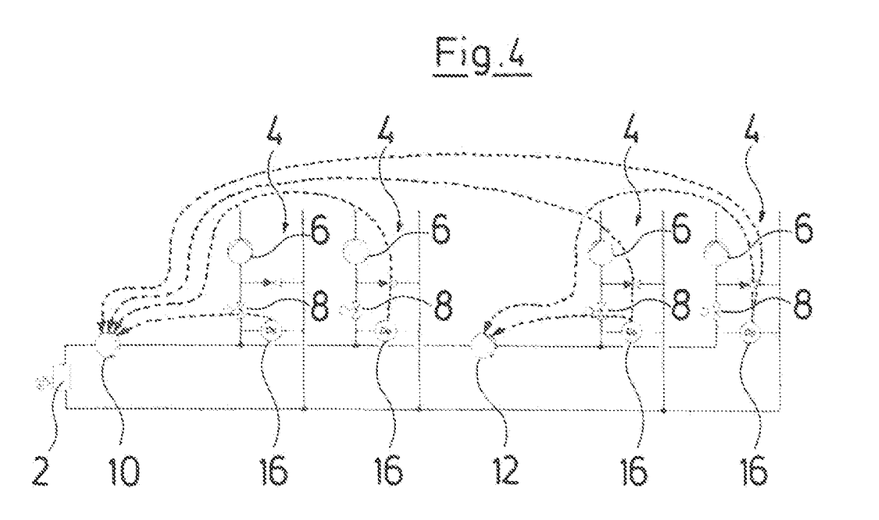
FIG. 4 is a view showing a fourth example for a hydraulic system according to the invention.

FIG. 3 shows a variant of the design in FIG. 2, with which the supply conduit 14 is designed as a ring conduit. FIG. 4 shows a variant of the hydraulic system in FIG. 1, in which it is not the valve opening degree of the control valve 8 which is detected in the load circuits 4, but the differential pressure Dp between the entry of the load circuit 4 and its exit, via a differential pressure sensor 16. An error signal is produced on the basis of this differential pressure, in a connected signal processing device which is preferably integrated in the differential pressure sensor 16, and this error signal is then outputted to the pump assemblies 10, 12 for their speed control. Here too, the error signals of the differential pressure sensors 16 of all four load circuits form the basis for the regulation of the speed of the first upstream pump assembly 10, whereas only the error signals of those differential pressure sensors 16 which are arranged in the load circuits situated downstream of the second pump assembly 12 form the basis of the speed control of the second downstream pump assembly 12.

Figure 5:
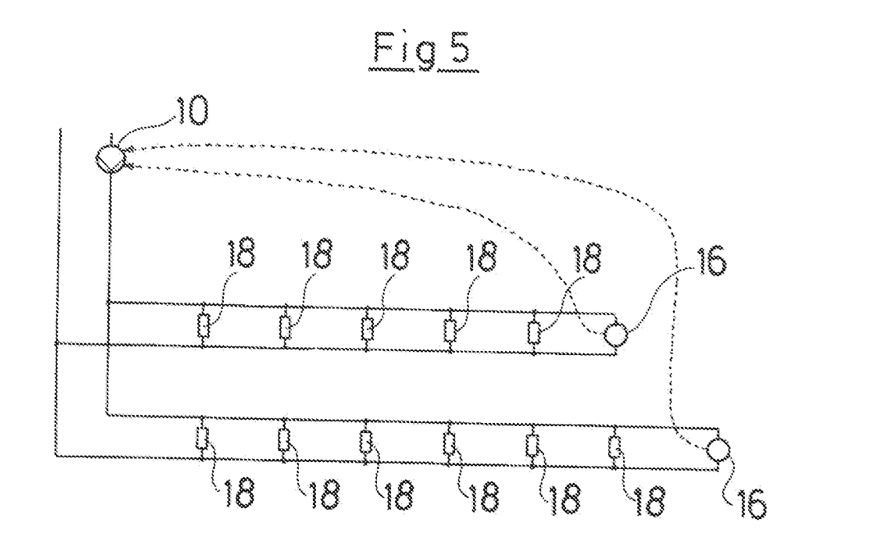
FIG. 5 is a view showing a fifth example for a hydraulic system according to the invention.

FIG. 5 shows a hydraulic system with which several consumers 18, for example radiators, are in each case arrange d parallel to one another in two branches arranged parallel to one another. The two branches connected in parallel are supplied with fluid, for example a heating medium in the form of water, by a common pump assembly 10 in the form of a circulation pump assembly. A differential pressure sensor 16 which detects the differential pressure Dp between the run-in and run-out of the respective branch at the end of the branch is arranged at the end of each of the branches. The differential pressure sensors 16, via signal processing devices, as described below, in turn output error signals which are led to the pump assembly 10 for its speed control.

Figure 6:
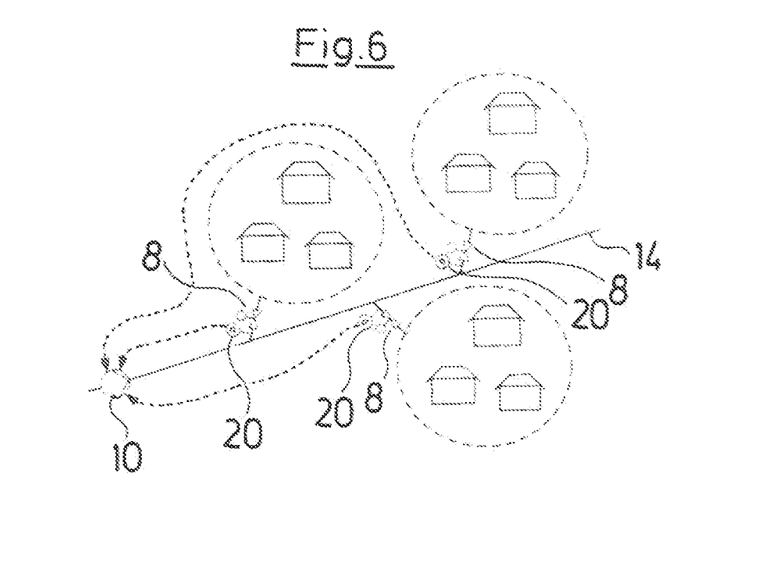
FIG. 6 is a view showing a sixth example for a hydraulic system according to the invention.

FIG. 6 shows a water supply mains as is shown in FIG. 2, only that here it is not the valve opening degree of the valves 8 which is detected, but pressure sensors 20 are arranged in the branches, in which the control valves 8 are situated, and these sensors detect the pressure p in these branches. An error signal is produced in a suitable signal processing device, in each case on the basis of the detected pressure p, as described hereinafter, and this signal is led further to the pump assembly 10 for its speed control.

Figure 7:
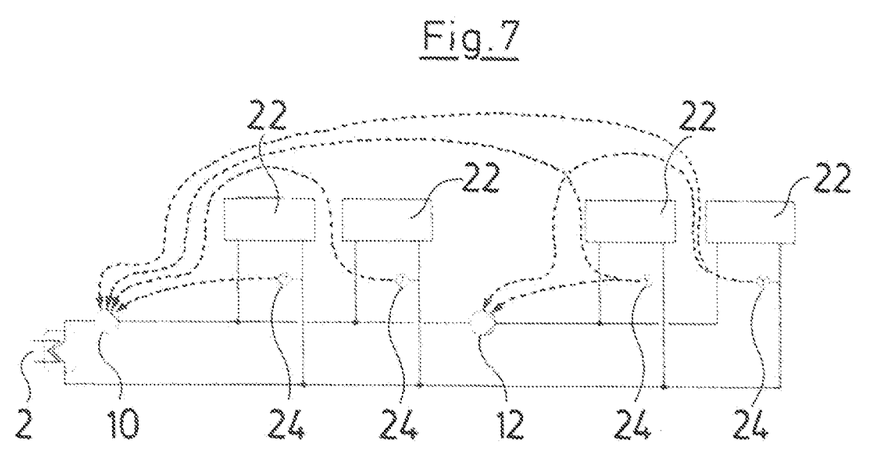
FIG. 7 is a view showing a seventh example for a hydraulic system according to the invention.

FIG. 7 shows a hydraulic system similar to the hydraulic system in FIG. 1, wherein instead of the load circuits 4, several consumers 22 are present, for example as heat exchangers in a room or building. The system for example can be a heating system or a cooling system, wherein here the heat source or cold source 2 is shown as a heat exchanger. In each case a temperature sensor 24 which detects a temperature T, which is to say the return temperature $T_r$ of the respective consumer 22, is arranged in the returns of the consumers 22. An error signal is produced in each case on the basis of the temperature signals of the temperature sensors 24, as described hereinafter, in a signal processing device, and this error signal is led further to the pump assemblies 10 and 12 for their speed control. Here too, the speed control of the first upstream pump assembly 10 is effected on the basis of the error signals of all temperature sensors 24 situated downstream, whereas the speed control of the pump assembly 12 is effected only on the basis of the error signals of those temperature sensors 24 which are situated downstream of the second pump assembly 12.

The pump assemblies 10 and 12 in each case comprise their own control device which is to say regulation device, which particularly preferably is arranged in a terminal box or electronics housing directly in the pump assembly or on its electrical drive motor. The signal processing devices for producing the error signals are preferably integrated into the sensors, which is to say the control valves 8, inasmuch as these detect the valve opening degree, into the pressure sensors 16, 22 or into the temperature sensors 24. Alternatively, the signal processing devices can be designed as separate subassemblies which are preferably separated from the pump assemblies 10, 12. However, it is also possible to integrate the signal processing devices into a pump assembly, in particular into the control device of a pump assembly. The signal processing devices permit almost any sensors and valves or actuating elements which detect their degree of actuation, for example a valve opening degree, to be linked to the pump assembly 10, 12.

The production of the error signals is described hereinafter in more detail by way of the examples in the FIGS. 8 and 10.

Figure 8A:
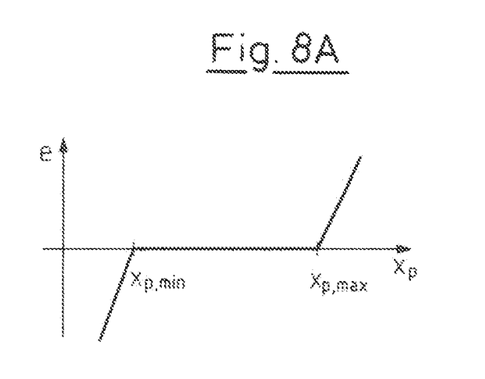
FIG. 8A is a view showing one of three variants for a group of functions for producing an error signal on the basis of a valve opening degree.
Figure 8B:
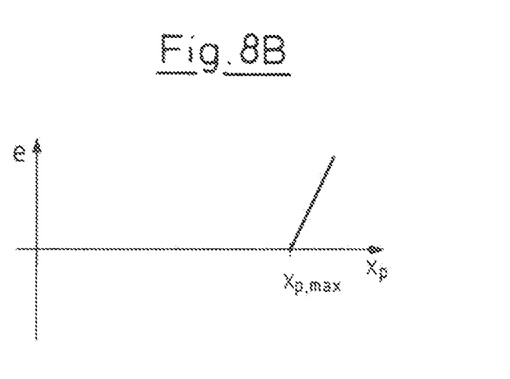
FIG. 8B is a view showing another of three variants for a group of functions for producing an error signal on the basis of a valve opening degree.
Figure 8C:
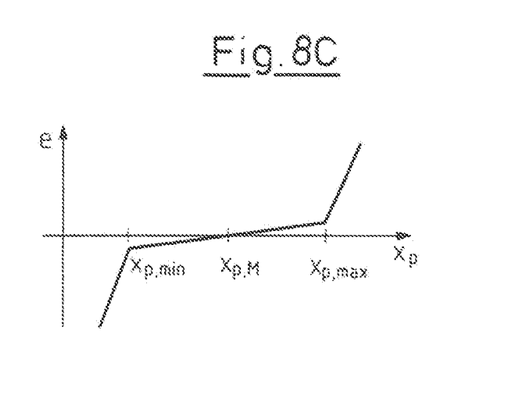
FIG. 8C is a view showing another of three variants for a group of functions for producing an error signal on the basis of a valve opening degree.

FIG. 8A-8C show three examples for the production of an error signal e on the basis of a valve opening degree $x_p$, which is detected and outputted for example from the control valves 8 described above. In the example according to FIG. 8A, a sectionwise monotonic function is used, in which three functions or sections with different functions are linked to one another:

$$e = \begin{cases} a(x_p - x_{p,min}), & x_p < x_{p,min} \\ 0, & x_{p,min} \leq x_p \leq x_{p,max} \\ a(x_p - x_{p,max}), & x_{p,max} < x_p \end{cases}$$

Here there are three functions. An error signal e is outputted according to the function $e=a(x_p-x_{p,max})$ above a limit value for the valve opening degree $x_{p,max}$ which represents an upper limit value, wherein the factor a is a preset constant. The function corresponds to a constant, here the value zero, between the limit values $x_{p,max}$ and $x_{p,min}$, wherein $x_{p,min}$ represents a lower limit value for the valve opening degree. This means that here the error signal e=0. An error signal e according to the function $e=a(x_p-x_{p,min})$ is outputted below the lower limit value $x_{p,min}$, which means the valve opening degree $x_p$ is a linearly dependent error signal. Thus in this example three functions are linked to one another, wherein in each case the function is exchanged on reaching the limit values $x_{p,min}$ and $x_{p,max}$. The desired operating point for the respective control valve 8, for which the valve opening degrees are outputted, in this example lies between the limits $x_{p,min}$ and $x_{p,max}$, so that the error signal e is formed such that the control strives to control the pump assembly 10 or the pump assembly 12 in its speed such that the control valve 8 assumes the desired operating point, i.e. a valve opening degree $x_p$, which is situated between the limit values $x_{p,min}$ and $x_{p,max}$. Above the upper limit value $x_{p,max}$ and below the lower limit value $x_{p,min}$, an error signal e is outputted in each case, which is taken into account in the speed control of the pump assembly such that the speed changes, so that the valve opening degree $x_p$ can again move into the region between the limits $x_{p,min}$ and $x_{p,max}$. The valve opening degree $x_p$ is preferably controlled via an independent control, for example in a heating system via a room thermostat.

FIG. 8B shows one variant to the group of functions according to FIG. 8A, with which one makes do without the lower limit value $x_{p,min}$ and thus the third function which is applied below the limit value $x_{p,min}$. This means that here a constant value of zero is always outputted for the error signal on falling short of the upper limit value $x_{p,max}$.

FIG. 8C shows a further variant, with which the functions for the region below the lower limit $x_{p,min}$ and above the upper limit $x_{p,max}$ correspond to those which were described by way of FIG. 8A. A function here is only used between the two limits $x_{p,min}$ and $x_{p,ax}$, and this function does not output a constant value zero for the error signal e, but likewise an error signal e which is linearly dependent on the valve opening degree $x_p$ and is with a sign change at the valve opening degree $x_{p,M}$ which in this region is situated in the middle between the lower and the upper limit value. The gradient of the curve for the error signal e between the lower limit $x_{p,min}$ and the upper limit $x_{p,max}$ is thereby lower than the gradient above and below these limit values. With such a control, an error signal e is outputted such that one succeeds in the valve opening degree $x_p$ preferably being held in the region of the middle value $x_{p,M}$, via the speed control of the pump assemblies 10 and 12.

Figure 9A:
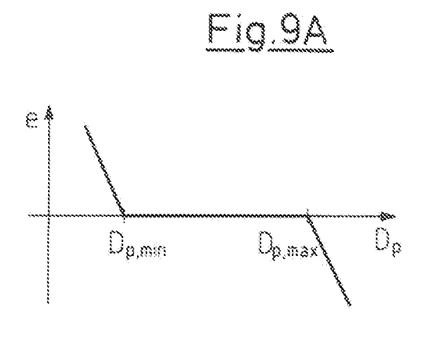
FIG. 9A is a view showing one of three variants of a group of linked functions for producing an error signal on the basis of a differential pressure.
Figure 9B:
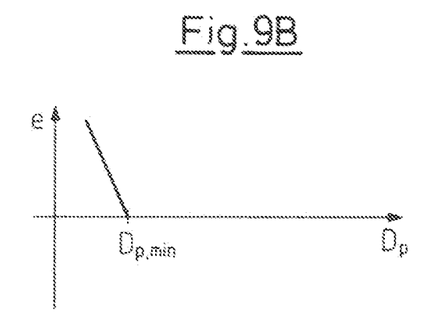
FIG. 9B is a view showing another of three variants of a group of linked functions for producing an error signal on the basis of a differential pressure.
Figure 9C:
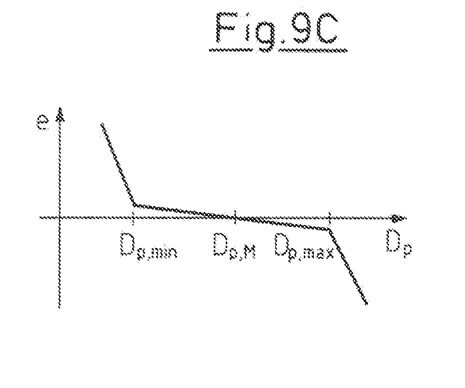
FIG. 9C is a view showing another of three variants of a group of linked functions for producing an error signal on the basis of a differential pressure.

FIGS. 9A-9C now show three similar examples for the output of an error signal e on the basis of a differential pressure Dp, as is detected for example according to the embodiment examples in FIGS. 4 and 5. According to FIG. 9A, a group of three functions which are linked to one another is provided:

$$e = \begin{cases} -a(Dp - Dp_{min}), & Dp < Dp_{min} \\ 0, & Dp_{min} \le Dp \le Dp_{max} \\ -a(Dp - Dp_{max}), & Dp_{max} < Dp \end{cases}$$

Here, an error signal e according to the function $e=-a(Dp-Dp_{min})$ is outputted below a minimal differential pressure value, which means below a lower limit value $Dp_{min}$, wherein a is a constant factor. Here too, a constant error signal e with the value zero is outputted between the limit values $Dp_{min}$ and $Dp_{max}$ (upper limit value). An error signal e according to the function $e=-a(Dp-Dp_{max})$ is outputted above the upper limit value $Dp_{max}$. This means that in each case an error signal e which is linearly dependent on the differential pressure Dp is outputted below the lower limit value $Dp_{min}$ and above the upper limit value $Dp_{max}$. The embodiment example according to FIG. 9B corresponds to the embodiment example according to FIG. 9A, wherein the third function for the region above $Dp_{max}$ is done away with, which is to say that here there is no upper limit $Dp_{max}$. Instead, a constant error signal e with the value zero is outputted above the lower limit value $Dp_{min}$.

With the embodiment example according to FIG. 9C, in a manner similar to the embodiment example according to FIG. 8C, an error signal e which is linearly dependent on the detected differential pressure Dp is likewise outputted between the limit values $Dp_{min}$ and $Dp_{max}$, wherein the error signal e has a zero point at the value Dp,M. The middle value Dp,M lies in the middle between the limit values $Dp_{min}$ and $Dp_{max}$. This control is suitable in order to control the differential pressure essentially to the middle value Dp,M, by way of a corresponding err or signal e being outputted if the differential pressure differs from this value. This error signal e then in turn has an influence on the speed of the pump assembly.

Figure 10A:
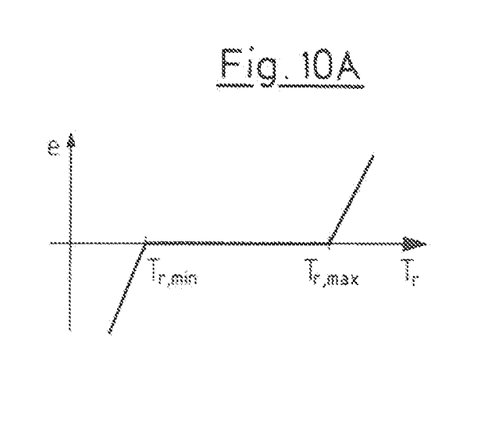
FIG. 10A is a view showing one of three variants of a group of functions for producing an error signal on the basis of a temperature value.
Figure 10B:
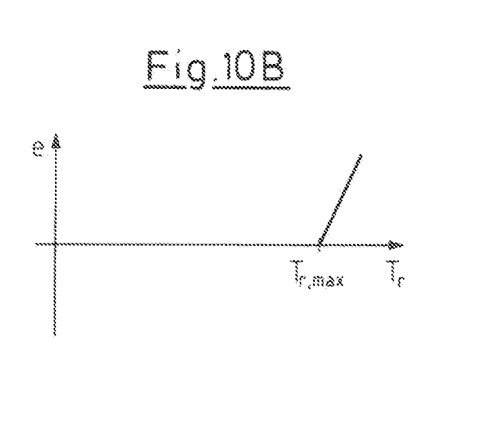
FIG. 10B is a view showing another of three variants of a group of functions for producing an error signal on the basis of a temperature value.
Figure 10C:
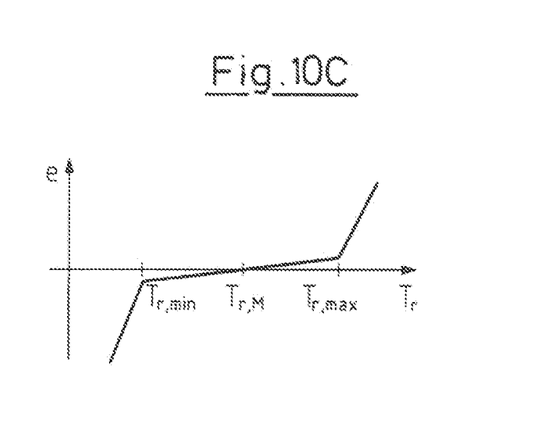
FIG. 10C is a view showing another of three variants of a group of functions for producing an error signal on the basis of a temperature value.

An example is now described by way of FIG. 10A-10C, in which the error signal e is outputted on the basis of a detected temperature value. The temperature value is detected for example in the previously explained example according to FIG. 7, in which the hydraulic system is a cooling system. The detected temperature value T is a return temperature value $T_r$. The error signal in the embodiment example according to FIG. 10A is for med according to the following group of functions:

$$e = \begin{cases} a(T_r - T_{r,min}), & T_r < T_{r,min} \\ 0, & T_{r,min} \le T_r \le T_{r,max} \\ a(T_r - T_{r,max}), & T_{r,max} < T_r \end{cases}$$

This means that below a lower limit value $T_{r,min}$, an error signal e according to the function $e=a(T_r-T_{r,min})$ is outputted, which means an error signal e which is linearly dependent on the return temperature $T_r$ and drops more greatly with a falling return temperature, wherein the error signal is negative. A constant error signal e with the value zero is outputted between the lower limit $T_{r,min}$ and the upper limit value $T_{r,max}$. Above the upper limit value $T_{r,max}$, an error signal e which is linearly dependent on the temperature $T_r$ and according to the equation $e=a(T_r-T_{r,max})$ is outputted. The value a is a constant factor in the previously mentioned equations. Thus an error signal e which increases linearly with the temperature $T_r$ is outputted above the value $T_{r,max}$.

The embodiment example according to FIG. 10B differs from the embodiment example according to FIG. 10A in that the first equation for the region below the lower limit value $T_{r,min}$ falls away or drops out, which means to say there are only two functions. The linearly dependent function for the error signal e is used above the limit value $T_{r,max}$, as has been described previously. A constant error signal e with the value zero is outputted below the value $T_{r,max}$.

The embodiment example according to FIG. 10C is identical to the embodiment example according to FIG. 10A with regard to the two functions for regions below the lower limit $T_{r,min}$ and above the upper limit $T_{r,max}$. A function according to which the error signal e is likewise linearly dependent on the detected temperature value $T_r$ is used in the region between the lower limit $T_{r,min}$ and the upper limit $T_{r,max}$, wherein the gradient of this function is less than that below and above the mentioned limit values. Moreover, the function between the limits has a zero point at the middle value $T_{r,M}$ which is situated in the middle between the lower limit and the upper limit $T_{r,max}$. This means that this method is suitable for controlling the return temperature $T_r$ to the value $T_{r,M}$, by way of an error signal e being outputted in each case given a deviation from this value, said error signal becoming larger or smaller with an increasing distance to the setpoint. A more accurate control to the middle value $T_{r,M}$ is made possible due to the shallower course of the curve between the values $T_{r,min}$ and $T_{r,max}$, than would be possible with the steeper curve course, which means with the curve course with a greater gradient above the upper limit $T_{r,max}$ and below the lower limit $T_{r,min}$.

Figure 11:
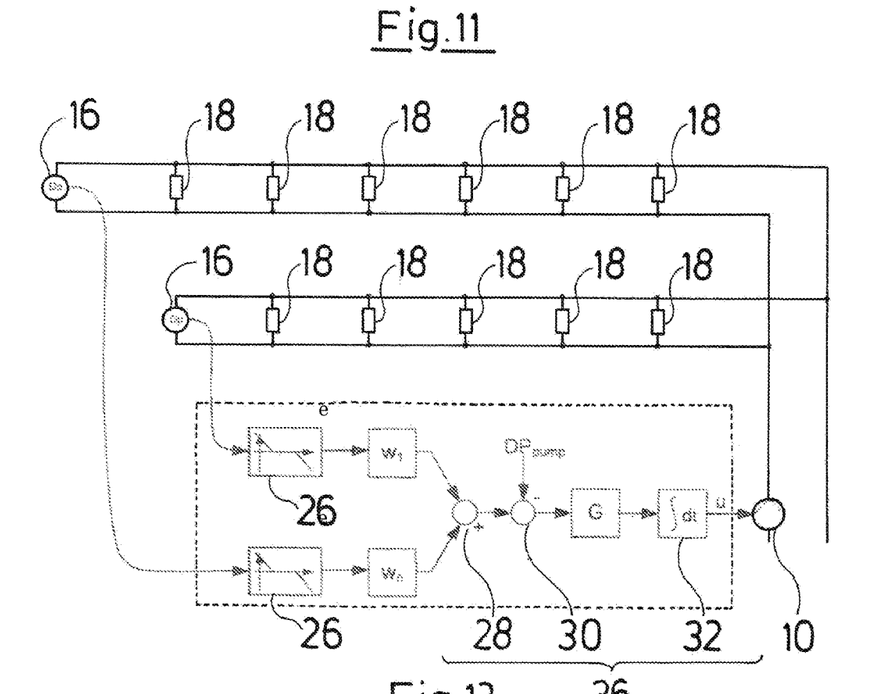
FIG. 11 is a schematic view showing the control method according to the invention and according to a first embodiment.
Figure 12:
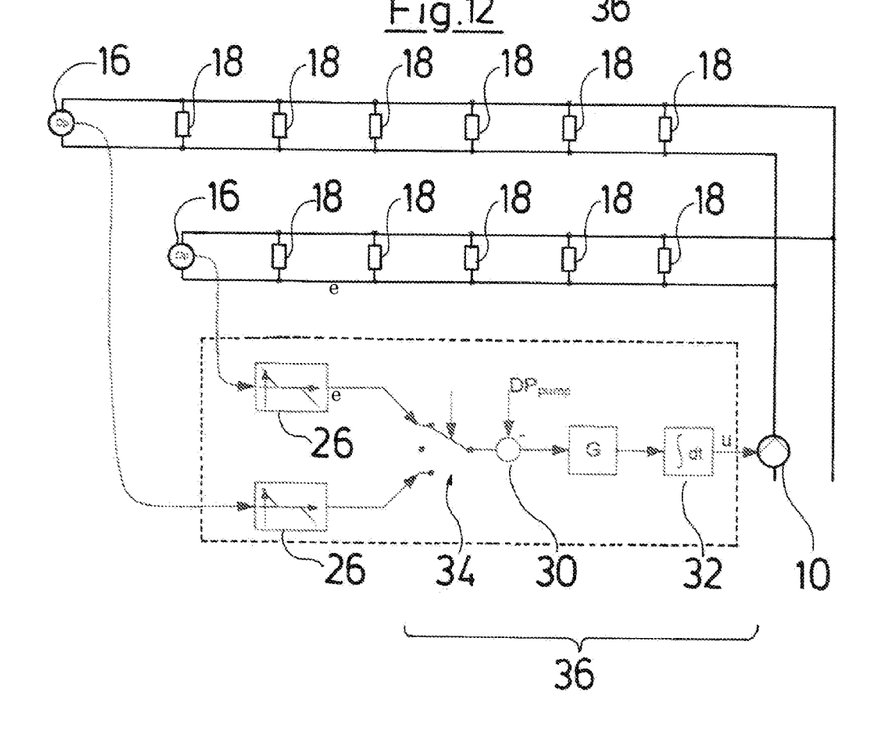
FIG. 12 is a schematic view showing the control method of the invention and according to a second embodiment.

Now two variants are described by way of FIGS. 11 and 12, with regard to how the error signal e can have a n influence on the speed of the pump assembly 10, 12. These examples according to FIGS. 11 and 12 are based on a hydraulic system as is shown in FIG. 5. However, it is to be understood that the processing of the produced error signals e can also be applied in a corresponding manner with different systems, in particular the previously described hydraulic systems. In both embodiment examples according to FIGS. 11 and 12, in each case the output signal of a differential pressure sensor 16 is firstly processed in a signal processing device 26 in each case, in order to produce the error signal e in the previously described manner. Thereby, an individual signal processing device 26 is preferably assigned to each sensor 16, wherein further preferably the signal processing device 26 also with the respective sensor form an integrated construction unit. The signal processing device 26 is preferably arranged in the proximity of the sensor, which is to say in a manner distanced to the pump assembly 10, so that only the error signal e is transferred to the pump assembly. The functions as have been hitherto described and are deposited in the signal processing device 26 for producing the error signal e are preferably adapted to the characteristics of the sensor or of the hydraulic region, in which the sensor is arranged, so that the err or signal e represents the requirements in the hydraulic region, and the hydraulic region can be controlled to a setpoint, for example with regard to the differential pressure Dp. With the use of other suitable sensors, as have been described previously, the error signal e can also be outputted such that a desired valve opening degree, a desired temperature, etc. is kept to.

In the example according to FIG. 11, the error signals e from the individual differential pressure sensors 16 are added. In the shown example, two differential pressure sensors 16 are shown, but it is to be under stood that accordingly more pressure sensors 16 with associated signal processing devices 26 can be used, wherein an individual error signal e is outputted for each differential pressure sensor 16. Apart from the differential pressure sensors 16, further sensors such as temperature sensors or sensors for detecting a valve opening degree or flow sensors can accordingly also be co-linked, wherein these then also each comprise a signal processing device 26 which outputs an associated error signal e. In this example, the error signals e are additionally differently weighted via weighting factors $w_1$ to $w_n$, before they are added in an adder 28. Subsequently, a signal DP which is negative, is added in a further adder 30, which means to say the signal DP is subtracted. The signal DP corresponds to the change of the power uptake or energy consumption in dependence on a control signal u for the pump assembly 10. In the subsequent step, this sum is multiplied by an amplification factor G and thereafter is integrated in an integrator 32, so that the independent control signal u is outputted for the control of the pump assembly 10. The control signal u can correspond directly to the speed n of the pump assembly, but also the delivery head h, which is to say the differential pressure across the pump assembly 10, 12 or the output or exit pressure $p_{out}$ or the exit flow $q_{out}$ of the pump assembly 10, 12. If the control signal u does not correspond directly to the speed n, thus the speed is then influenced indirectly, since the control of the pressure is effected for example via the speed of the pump assembly 10, 12.

The change of the control signal according to the preceding example is computed according to the following formula:

$$\frac{du}{dt} = -G\left(DP_{pump} - \sum_{i=1}^{N} w_i e_i\right)$$

With this equation, an optimisation with regard to the energy consumption is simultaneously achieved via the signal DP which can be approximated by a constant value.

Instead of this signal, an optimisation could also be effected via a constant in the following manner:

$$\frac{du}{dt} = \begin{cases} s, & 0 > \sum_{i=1}^{N} e_i \\ -s, & \text{otherwise} \end{cases}$$

Thereby, the values is a constant factor which is positive in the case, in which the sum of the error signals e over the complete number N of sensors and/or of signal-issuing units such as valves is smaller than zero. A constant value s is outputted in all other cases.

Differential expressions were applied according to the previously described embodiment. However, it is to be understood that instead of this, one could also apply discrete versions, for example in the form of the following equations:

$$u_{k+i} = u_k - G\left(DP_{pump} - \sum_{i=1}^{N} e_i\right) \quad u_{k+1} = u_k + \begin{cases} s, & 0 > \sum_{i=1}^{N} e_i \\ -s, & \text{otherwise} \end{cases}$$

k is a temporal step in these equations. The factors G and s in turn are constants.

Instead of weighting the error signals e with weighting factors w, the error signals e, as the case may be, can also be directly added also without any weighting in a corresponding manner.

A selection as is described by way of FIG. 12, can also take place instead of the addition of the error signals e. In the example according to FIG. 12, in contrast to the example according to FIG. 11, the adder 26 is replaced by a selection device 34. This means that an error signal e which is then led to the adder 30 is always selected via the selection device 34. The further signal processing as described above by way of FIG. 11 is then effected subsequently to the adder 30. The selection device 34 for example can be designed such that the error signal e of one of the sensors is selected in each case according to a predefined condition such as a prioritisation. This means that firstly the err or signal e of a sensor with the highest priority is selected and then, as the case may be, the error signal of one or more sensors with a subsequent priority is selected, inasmuch as the signals of the previously prioritised sensors are zero. Here, differently suitable selection methods can be applied. Other prioritisations are also possible. Thus individual sensors can be prioritized with regard to their upper limit or their lower limit. If for example the maximum is prioritized, the error signal e of these sensors would be positive, as shown in the previously described examples. Thus for example only the sum of these sensors whose error signal e is positive could be taken into account. In the case that the upper limit is exceeded for none of these prioritised sensors, which means no positive error signal is outputted, then the control can also be carried out on the basis of all other, as the case may be, also negative error signals, in the manner mentioned previously.

The part of the control device which is characterised with the reference numeral 36 in FIGS. 11 and 12 is preferably integrated into the control device of the pump assembly 10, 12, whereas the signal processing devices 26 are preferably assigned to the sensors or are integrated into these.

LIST OF REFERENCE NUMERALS

2—heat source or cold source
4—load circuits
6—mixing pump
813 control valve
10, 12—pump assembly
14—supply conduit
16—differential pressure sensor
18—consumer
20—pressure sensor
22—consumer
24—temperature sensor
26—signal processing device
28, 30—adder
32—integrator
34—selection device
36—part of the control device
e—error signal
$x_p$—valve opening degree
Dp—differential pressure
T—temperature
DP—change of power uptake
G—amplification factor
u—control signal

What is claimed is:

1. A control method for a pump assembly in a pneumatic or hydraulic system, the method comprising the steps of: detecting at least one system variable in the system; closed loop controlling a speed of the pump assembly in dependence on the at least one system variable which is detected in the system; computing an error signal from the at least one detected system variable via a sectionwise monotonic function, the sectionwise monotonic function being composed of at least two function sections with different function characteristics; detecting at least another system variable in the system such that several system variables are detected in the system, wherein the step of computing the error signal comprises computing an error signal for each detected system variable via the sectionwise monotonic function, wherein each detected system variable is compared with an upper limit value and a lower limit value of the sectionwise monotonic function, wherein upon reaching either limit value, the function section, on the basis of which the error signal is computed, is switched to a different function section, wherein function sections which are applied above the upper limit value and/or below the lower limit value output an error signal which changes in a linearly dependent manner based on a magnitude of the detected system variables, wherein all of the computed error signals are added together to provide added error signals, and the added error signals are used as a basis for the step of controlling the speed of the pump assembly such that a sum of the added error signals approaches a value zero.

2. A control method according to claim 1, wherein the at least one system variable is a pressure value or a valve opening degree, which is detected in the system.

3. A control method according to claim 1, wherein the at least one system variable is a temperature value or flow value, which is detected in the system.

4. A control method according to claim 1, wherein one of the at least two function sections which outputs an error signal which changes in a linearly dependent manner on the magnitude of the system variables is applied below the upper limit value and above the lower limit value, wherein the at least two functions sections have different gradients.

5. A control method according to claim 4, wherein the one of the at least two function sections which outputs an error signal has a zero point with a sign change in a region above the lower limit value and below the upper limit value, wherein the different gradients comprise a first gradient between the lower limit value and the upper limit value, a second gradient above the upper limit value and a third gradient below the lower limit value, the first gradient being less than the second gradient and the third gradient.

6. A control method according to claim 1, wherein an error signal which is outputted upon a variable reaching or falling above the upper limit value has a different sign than an error signal which is outputted upon a variable reaching or falling below the lower limit value.

7. A control method according to claim 1, wherein the computation of the error signal is effected in a signal processing device assigned to a sensor for detecting the system variables, and the computed error signal is transferred to a control device of the pump assembly which effects the control of the speed of the pump assembly, wherein all of the computed error signals are added together prior to the added error signals being provided as input to the control device.

8. A control method according to claim 1, wherein the error signals are multiplied by individual weighting factors before the addition step.

9. A control method according to claim 1, wherein one or more error signals are selected from the computed error signals and the control of the speed of the pump assembly is effected on the basis of the one or more selected error signals.

10. A control method according to claim 1, wherein the speed of the pump assembly is controlled in dependence on a differential pressure or a flow, and the differential pressure or flow is controlled on the basis of one or more of the error signals.

11. A control method according to claim 1, wherein the speed of the pump assembly is changed directly or indirectly in defined steps, in dependence on the error signals.

12. A control method according to claim 1, wherein the speed of the pump assembly and the error signals are both controlled on the basis of an algorithm for minimizing power uptake.

13. A control method according to claim 12, wherein the algorithm for minimizing power uptake minimizes energy consumption by reducing the speed of the pump assembly.

14. A pump system comprising:
at least one sensor for detecting a variable in a hydraulic or pneumatic system;
a signal processing device designed for computing at least one error signal on the basis of the detected variable;
at least one pump assembly with a control device for receiving the at least one error signal from the signal processing device and for controlling a speed of the pump assembly on the basis of the at least one error signal, wherein the control device and the signal processing device are configured for carrying out a control method comprising the steps of:
detecting at least two system variables in the system;
controlling a speed of the pump assembly in dependence on the at least two system variables detected in the system;
computing error signals from the at least two detected system variables, each of the error signals being computed via a sectionwise monotonic function to provide computed error signals, the sectionwise monotonic function being composed of at least two function sections with different function characteristics, wherein each detected system variable is compared with an upper limit value and a lower limit value of the sectionwise monotonic function, wherein upon reaching either limit value, the function section on the basis of which one of the error signals is computed, is switched to a different function section, wherein function sections which are applied above the upper limit value and/or below the lower limit value output an error signal which changes in a linearly dependent manner based on a magnitude of the detected variables, wherein all of the computed error signals are summed together to provide summed error signals, and the summed error signals are used as a basis for the step of controlling the speed of the pump assembly such that the summed error signals approach a zero value.

15. A control method for a pump assembly in a pneumatic or hydraulic system, the method comprising the steps of: providing at least one first sensor for detecting a first system variable in the pneumatic or hydraulic system; providing at least one second sensor for detecting a second system variable in the pneumatic or hydraulic system; detecting at least one first system variable in the system with the at least one first sensor; detecting at least one second system variable in the system with the at least one second sensor; providing a signal processing device designed for producing at least one first error signal on the basis of the detected first system variable and for producing at least one second error signal based on the detected second system variable; providing at least one pump assembly with a control device for receiving the at least one first error signal and the at least one second error signal from the signal processing device and for controlling a speed of the pump assembly on the basis of the at least one first error signal and the at least one second error signal; controlling, with the control device, a speed of the pump assembly in dependence on the at least one first system variable and the at least one second system variable which are detected in the system; computing an error signal, with the signal processing device, from the detected at least one first system variable via a sectionwise monotonic function, the sectionwise monotonic function being composed of at least two function sections with different function characteristics; computing another error signal, with the signal processing device, from the detected at least one second system variable via the sectionwise monotonic function, wherein each of the detected variables is compared with an upper limit value and a lower limit value of the sectionwise monotonic function, wherein upon reaching either limit value, the function section, on the basis of which the error signal is computed, is switched to a different function section, wherein function sections which are applied above the upper limit value and/or below the lower limit value output an error signal which changes in a linearly dependent manner based on a magnitude of the detected variables, wherein all of the computed error signals are summed together to provide summed error signals, and the summed error signals are used as a basis for the step of controlling the speed of the pump assembly such that the sum of the summed error signals approaches a value zero.

16. A control method according to claim 15, wherein the error signals are multiplied by individual weighting factors before the summation step.

17. A control method according to claim 15, wherein one or more error signals are selected from the computed error signals and the control of the speed of the pump assembly is effected on the basis of the one or more selected error signals.

* * * * *